(12) United States Patent
Deshpande

(10) Patent No.: US 7,149,291 B1
(45) Date of Patent: Dec. 12, 2006

(54) METHOD AND APPARATUS FOR REDUCING INBOUND TRAFFIC CONGESTION IN A VOICE FRAME NETWORK

(75) Inventor: Bhalchandra Dattatray Deshpande, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 845 days.

(21) Appl. No.: 09/604,712

(22) Filed: Jun. 27, 2000

(51) Int. Cl.
*H04M 15/00* (2006.01)
*H04L 1/00* (2006.01)

(52) U.S. Cl. .................. 379/112.01; 379/111; 370/230; 370/235

(58) Field of Classification Search ............... 370/229, 370/230, 230.1, 231, 232, 233, 234, 235, 370/237; 379/111, 112.01, 112.03, 112.04, 379/112.05, 112.1, 221.07
See application file for complete search history.

(56) References Cited

U.S. PATENT DOCUMENTS

| | | | |
|---|---|---|---|
| 5,659,541 A * | 8/1997 | Chan | 370/236 |
| 6,064,653 A * | 5/2000 | Farris | 370/237 |
| 6,671,262 B1 * | 12/2003 | Kung et al. | 370/260 |
| 6,781,971 B1 * | 8/2004 | Davis et al. | 370/395.42 |
| 2002/0075799 A1 * | 6/2002 | Bennett | 370/229 |

* cited by examiner

*Primary Examiner*—Ovidio Escalante
(74) *Attorney, Agent, or Firm*—Marger Johnson & McCollom PC (57) ABSTRACT

The invented method of reducing voice frame network inbound traffic congestion first determines whether a first defined threshold level of inbound voice and data traffic is reached. If so, then the method discriminates between inbound voice and data traffic within an input queue. Discrimination is by analyzing the size of each packet and comparing it to predefined packet size criteria and/or by analyzing the rate at which packets of inbound voice and data traffic arrive in the input queue and comparing it to predefined arrival rate criteria. Finally, the method frees space within the input queue for use by inbound voice traffic until the first defined threshold level of inbound traffic no longer is reached. The freeing of space includes selectively discarding data, which discarding preferably continues until a second defined threshold level of inbound traffic is reached, the second defined threshold level being less than the first defined threshold level. The invented apparatus includes decision logic for making such a determination and queue management logic responsive thereto for such discrimination and freeing of space. A user interface preferably is provided that permits a user to define the first and second defined threshold levels, which are implementation- and application-dependent.

16 Claims, 5 Drawing Sheets

METHOD AND APPARATUS FOR REDUCING INBOUND TRAFFIC CONGESTION IN A VOICE FRAME NETWORK

BACKGROUND OF THE INVENTION

This invention relates to voice frame network performance enhancement, and more specifically to method and apparatus for handling congested inbound traffic over a voice frame network such as one operating under a voice over Internet protocol (VoIP).

In most cases where aggregation and edge routers have multiple interfaces, forwarding capacity of the router is not enough to concurrently handle data coming in at the line rate at all the interfaces. For example, with fast Ethernet, data coming in at the line rate on a single interface can saturate the forwarding engine. Random loss of data at the input of an interface results. Yet it is difficult to control the sources of the incoming data because of the burst nature of the data traffic over such interfaces. To avoid loss of voice packets in such circumstances, voice data must be differentiated from the rest of the data packets before the data are forwarded.

Suggested approaches to solving the congestion problem include the use of hardware support and layer two classification schemes like the IEEE 802.1p Ethernet standard. That suggested solution would require separate queues of data at the input of an interface as per the classification levels expounded in the referenced standard. That suggested solution also would require special hardware to support layer two classification, and requires modification of the scheduling framework of the operating system (OS) because the OS would have to service multiple input queues per interface, which require service in the order of their priority level. Another problem with that suggested solution involves the different classification schemes at layer three, since for layer two classification to be effective there must be a proper mapping from layer three to layer two classification.

There are various layer two and layer three methods of classification available. There are different problems associated with using them. Layer two classification schemes like IEEE 802.1p require special hardware to implement them, which rules out the possibility of using them on existing platforms. The problem in using layer three data classification scheme is that there are different data classification schemes at layer three. Most prominent of the layer three classification schemes is Ipv4 TOS bits (RFC791), Ipv6 Traffic Class octet (RFC 2460) and Diffserv code point (RFC 2474). Supporting all these data schemes to classify the data would create a large performance degradation under normal circumstances.

A superior solution would solve the congestion problem, i.e. input queue overflow, at the lowest possible level, e.g. hardware or close to hardware, depending on the platform. At this level, it is very important to not lose time in classifying the packet, which packet classification is required in any solution. The following key requirements thus are noted.
  a) The input classification should not have any negative impact on performance under normal circumstances, i.e. when there is no congestion.
  b) In case of input traffic congestion, such condition should be detected before the input queue overflow occurs.
  c) After detecting the input congestion, the method of discriminating the voice packets from the data packets should be fast and simple.
  d) The goal of discriminating voice from data is to give priority to the voice packets. It is not necessary to differentiate between various data categories.
  e) Making multiple input queues per interface a part of the solution should be avoided. This is because multiple input queues require OS-level service support.

SUMMARY OF THE INVENTION

The invented method of reducing voice frame network inbound traffic congestion first determines whether a first defined threshold level of inbound voice and data traffic is reached. If so, then the method discriminates between inbound voice and data traffic within an input queue. Discrimination is by analyzing the size of each packet and comparing it to predefined packet size criteria and/or by analyzing the rate at which packets of inbound voice and data traffic arrive in the input queue and comparing it to predefined arrival rate criteria. Finally, the method frees space within the input queue for use by inbound voice traffic until the first defined threshold level of inbound traffic no longer is reached. The freeing of space includes selectively discarding data, which discarding preferably continues until a second defined threshold level of inbound traffic is reached, the second defined threshold level being less than the first defined threshold level.

The invented apparatus includes decision logic for making such a determination and queue management logic responsive thereto for such discrimination and freeing of space. A user interface preferably is provided that permits a user to define the first and second defined threshold levels, which are implementation- and application-dependent.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

The present invention makes use of the characteristics of the voice data to classify the voice packets from the data packets. The voice packets are generated at regular intervals. The size of the voice packet is well known for every codec used. Knowing the various codecs that support voice traffic, the range of packet sizes for voice data can be easily determined. The following Table 1 shows the range of data payload and rate (in kilobits per second (kbps)) for different codecs.

TABLE 1

| Codec (rate) | Payload |
|---|---|
| G.711 (64 kbps) | 240 bytes |
| G.711 (64 kbps) | 120 bytes |
| G.726 (32 kbps) | 120 bytes |
| G.726 (24 kbps) | 80 bytes |
| G.726 (24 kbps) | 40 bytes |
| G.728 (16 kbps) | 80 bytes |
| G.729 (16 kbps) | 40 bytes |
| G.729 (8 kbps) | 40 bytes |
| G.729 (8 kbps) | 20 bytes |
| G.723.1 (6.3 kbps) | 48 bytes |
| G.723.1 (6.3 kbps) | 24 bytes |
| G.723.1 (5.3 kbps) | 40 bytes |
| G.723.1 (5.3 kbps) | 20 bytes |

Those of skill in the art will appreciate that the non-voice data payload is variable and that most data applications try to send the data up to the maximum transmission unit (MTU) limit. Besides having relatively small and regularly timed packets, another distinguishing characteristic of voice data is that voice data is only a small percentage of total data traffic in most cases. This is particularly true for local area networks (LANs). In certain cases like voice aggregation routers, the voice traffic is the majority of the traffic, but in those cases the problem addressed by the invention does not exist.

The input queue, or ring buffer, of the router is designed to hold a few milliseconds worth of data at the line speed. (For a fast Ethernet interface, on a 1700 series router, the input buffer size is equivalent to storing 7.5 ms of data at 100 megabits per second (Mbps)). Even with a codec like G.711, which is worst in performance in terms of efficient bandwidth utilization, the required bandwidth is only 76 kbps per voice channel. Thus, it would take aggregation of more than 1000 voice channels to saturate the entire bandwidth. Generally speaking, modern codecs like G.729 and G.723 use only approximately 17 to 18 kbps per voice channel. If input congestion occurs and if two-thirds of the ring is full, then more than 90% of the data on the input ring buffer is likely to be non-voice data. Of this non-voice data, most will be outside the voice payload range of 20 to 240 bytes.

Figure 1:
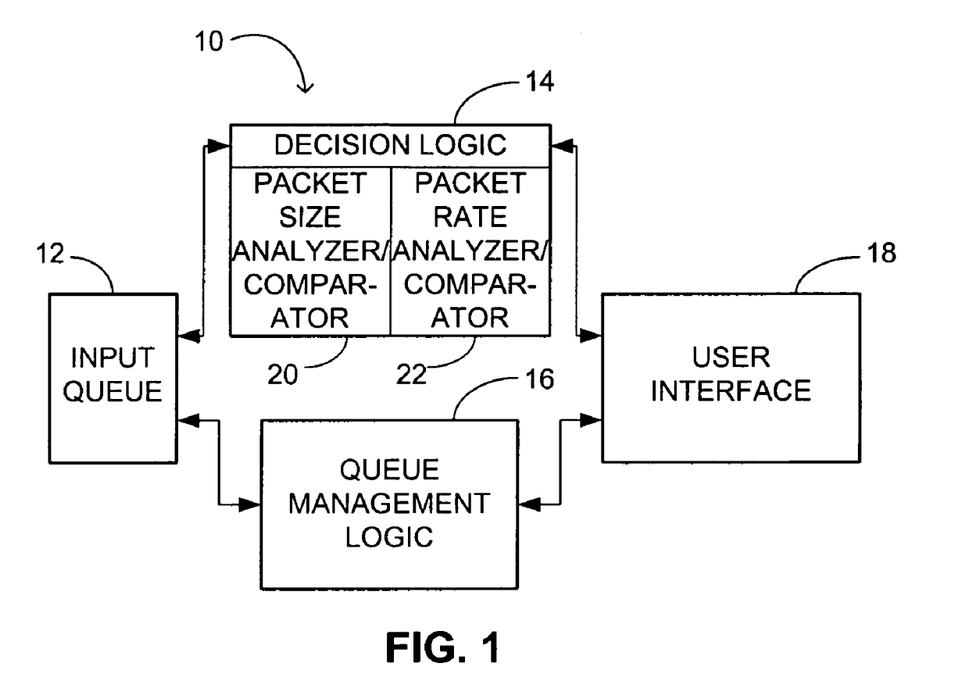
FIG. 1 is a block diagram of the apparatus in accordance with a preferred embodiment of the invention.

Referring first to FIG. 1, the apparatus of the invention is indicated at 10. Apparatus 10 is for use with an input queue 12 representing inbound voice and data traffic on a voice frame network (not shown for the sake of clarity). Apparatus 10 includes decision logic 14 capable of determining whether a first defined threshold level of inbound voice and data traffic represented in input queue 12 is reached. Responsive to an affirmative determination from decision logic 14, queue management logic 16 discriminates between inbound voice and data traffic within input queue 12. Queue management logic 16 also frees space within therein for use by inbound voice traffic until the first defined threshold level of inbound voice and data traffic no longer is reached. Preferably, queue management logic 16 frees space until a second defined threshold level of inbound traffic is reached, the second defined threshold level being less than the first defined threshold level. Preferably, apparatus 10 includes a user interface 18 that permits a user to define the first and second defined threshold levels.

Decision logic 14 preferably includes a packet size analyzer and comparator 20. Analyzer/comparator 20 analyzes the size of each packet of inbound voice and data traffic within input queue 12 and compares the packet sizes to predetermined packet size criteria. Such criteria may be preprogrammed into decision logic 14 or may be specified over user interface 18. Decision logic 14 also preferably includes a packet rate analyzer and comparator 22. Analyzer/comparator 22 analyzes the rate at which inbound voice and data traffic arrive in input queue 12 and compares the packet arrival rate to predefined arrival rate criteria. Such criteria also may be preprogrammed into decision logic 14 or may be specified over user interface 18.

Preferably, the invention is implemented in software, although firmware or hardware or any combination is contemplated, and is within the spirit and scope of the invention. The software modules include the following, in accordance with the preferred embodiment of the invention.

1) A first function is provided that is called by the interrupt handler that services the receive ring buffer. This first function will look at the queue depth every time it is called and compare it with the threshold. If the queue depth is less than the first threshold, then the first function returns without doing anything. If the first function determines that the queue depth is greater than or equal to the threshold, then it scans the input queue and creates space on the input queue based on the criteria described above.

2) If the first function is not able to create enough space, then a second function will be called. This second function will use more detailed classification techniques to discriminate between data traffic and voice traffic and to eliminate the former. However, the use of this second function is relatively costly in terms of additional computational cycles and therefore the second function is optional.

3) The last module takes the form of user interface code. This user interface will allow the user to specify the upper and lower thresholds and the payload ranges for voice data. This module can also be made optional, depending upon the requirements. This is because, as explained earlier, most of the voice codecs are well known and the payload ranges for voice packets are also well known.

Figure 2:
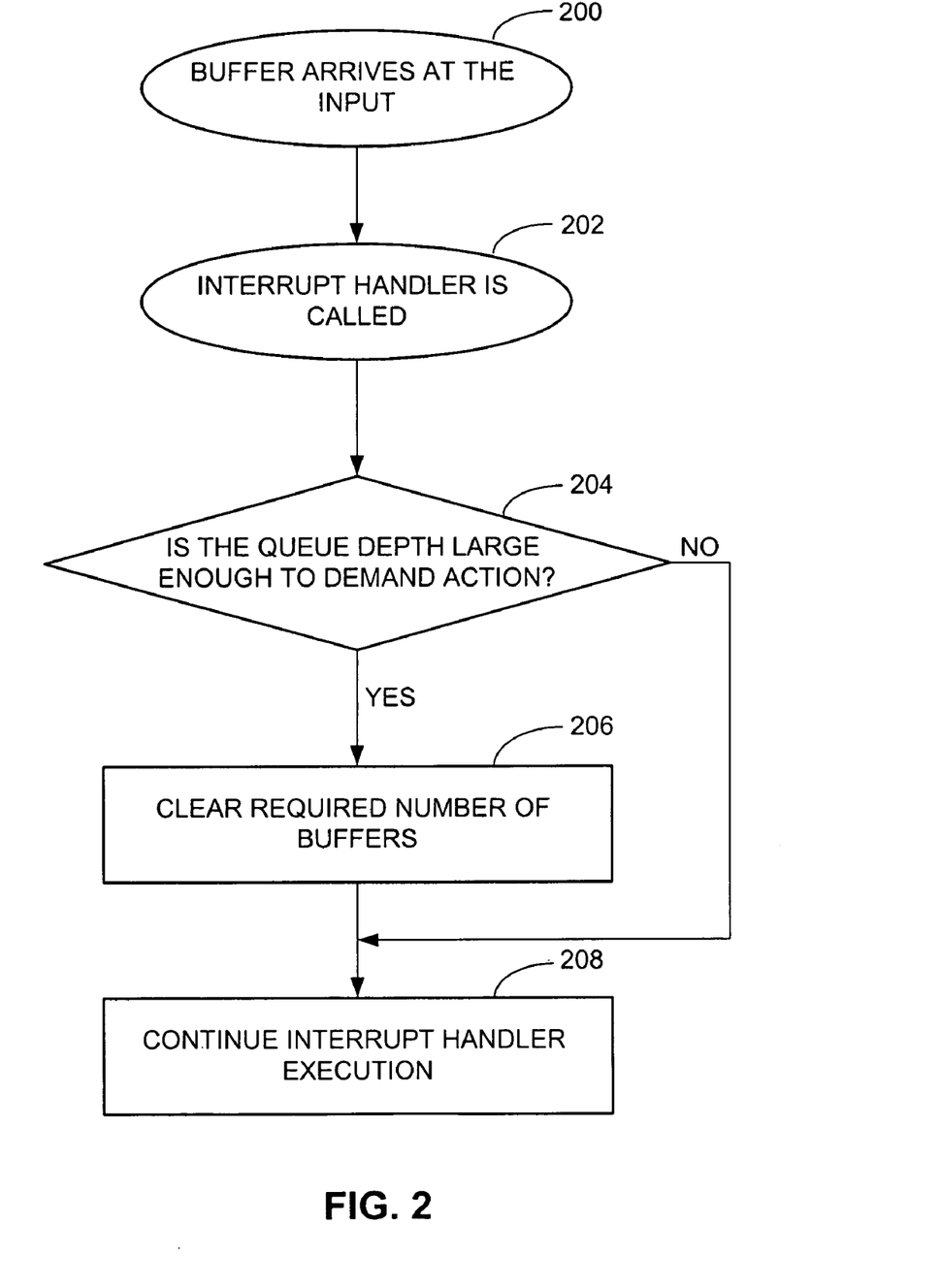
FIG. 2 is a flowchart illustrating an overview of the method in accordance with a preferred embodiment of the invention.

Referring now to FIG. 2, it may be seen that the depicted software method is part of an input interrupt service routine. In a typical router, the arrival of a packet at the input queue, indicated at 200, generates an interrupt and an interrupt handler is called at 202. Those of skill in the art will appreciate that the servicing of the interrupt normally involves packet forwarding. If the input queue depth, i.e. the number of entries in the queue awaiting forwarding, grows beyond a first certain threshold, as determined at 204, then inbound congestion is indicated. Those of skill will appreciate that the first threshold is implementation- and application-dependent. For example, the first threshold might represent a queue depth of thirty entries.

Thus, the invented method involves first checking to see if the threshold has been reached after the arrival of every packet. It then involves identifying and clearing or freeing non-voice packets at 206 (by scanning the input queue, ascertaining the size of the data to discriminate voice from data and discarding data in favor of voice) until the queue depth falls beneath a second certain threshold. Thereafter, interrupt handler execution resumes at 208. The second threshold is also implementation- and application-dependent, and preferably is less than the first threshold since the thresholds represent congestion. For example, the second threshold might represent a queue depth of twenty-five entries. Those of skill in the art will appreciate that if the first and second thresholds instead represent capacity, then the logic is reversed and the second threshold typically would be greater than the second threshold. Such modifications are contemplated as being within the spirit and scope of the invention.

Those of skill in the art will appreciate that the difference between the first and second thresholds affects how much processing time is spent freeing space in the input queue and how much temporary storage is required, as will be seen. The first and second thresholds depend upon the line speed of the interface, available memory pool for the interface, the number of entries in the input ring buffer or queue and the forwarding capacity of the router.

Those of skill in the art will appreciate that dropped data packets typically are detected and retransmitted and their arrival sequence is unimportant, whereas voice communication requires sequenced and timely reception of voice packets.

Thus, in a congested situation, voice packet forwarding is given priority over data packet forwarding to avoid loss of voice data. Importantly, the invented method avoids the cost of first forwarding the data to output queues and later dropping it, e.g. by means of conventional weighted random early detection (WRED) or traffic shaping.

If the second threshold cannot be achieved by simple data size determination, then the method may further involve using source identifier and frequency attributes to identify and free further non-voice packets that are of the same size as the voice packets. This computationally demanding third step whereby same-size non-voice packets may be discriminated from voice packets would use source identifier, packet size and number of occurrences in a given window of time, e.g. five milliseconds (ms). If a source is sending large numbers of packets in a given window of time, then they are most likely data packets. Those of skill in the art will appreciate that the exception to this rule is the case in which a source is doing aggregation of different voice streams, but such sources typically may be ascertained and marked so that the input queue entries are properly identified as voice packets.

The additional code takes the form of a new data structure, a short function to find the queue depth (to be described below) and a short function to identify and clear the non-voice data buffers from the input ring. After the required buffers are cleared, the original interrupt handler continues as usual, as indicated in FIG. 2 at 208.

The new data structure requirement of the invented method is minimal. An additional data structure is needed to hold a pointer. The pointer indicates the addresses of buffer descriptors associated with voice packets that are interleaved between data packets cleared from the input ring. The format of this temporary storage is same as that of the input ring of buffer descriptors.

The invented method relies on finding the input queue depth at every interrupt handling instance. Finding the input queue depth is made difficult by the fact that in most implementations the input queue is a circular buffer and hardware and software pointers are manipulated independent of each other. To understand the technique used, some explanation of platform-specific details is needed, although those of skill in the art will appreciate that the details are explanatory only and do not limit the broad applicability of the invention.

Figure 3:
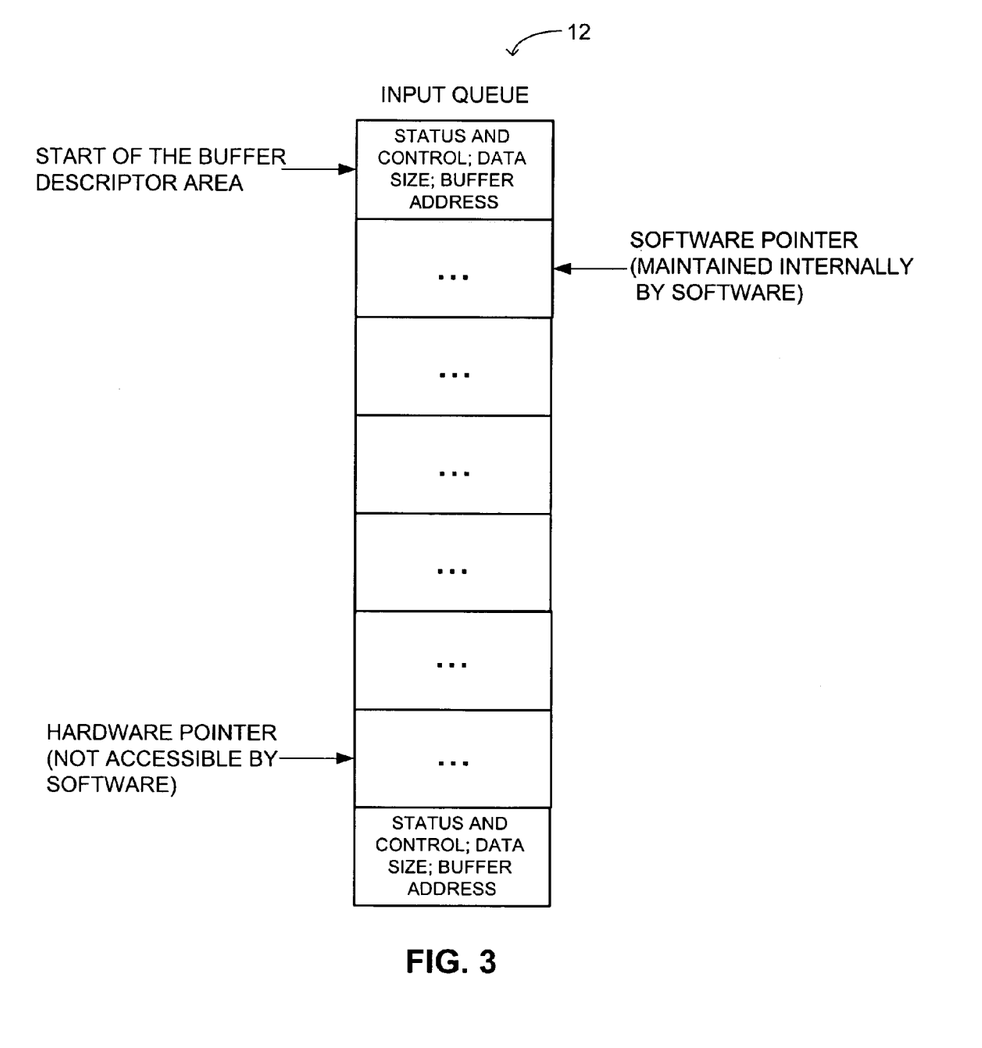
FIG. 3 is a block diagram illustrating an input queue mechanism and its pointers.

Referring to FIG. 3, consider a platform based on the MPC 860 central processing unit (CPU). Input queue 12 of the interface consists of physically contiguous buffer descriptor entries. Each buffer descriptor entry typically includes status and control, data size and a pointer to (address of) an accrual data buffer. There is a separate hardware pointer maintained by the CPU which points to the buffer descriptor that will be used when data arrives at the input. After arrival of the data, an interrupt may be generated and the software then processes the data in the buffer and marks the buffer as empty. When the last buffer descriptor (identified by the W bit, not shown) in the list is used, the hardware automatically resets the pointer to the first buffer descriptor in the list. If this buffer descriptor is not marked empty by the software, then it cannot be reused by the hardware and if data arrives at the input under such condition, then it is dropped and a busy error is generated.

Those of skill in the art will appreciate that a difficult part of solving the problem is to find the depth of the input queue which is in the form of a circular buffer. On platforms that do not allow reading of the hardware pointer, the following technique can be used to determine whether the input queue depth has exceeded the threshold. This technique uses a busy bit in the each buffer descriptor entry to determine if the queue has crossed the first threshold. In the worst possible case, a maximum of three such checks are required. From a performance point of view, this does not have a significant impact. For slower platforms, the hardware allows the value of the hardware pointer to be read by the software, which makes it easier to find queue depth and greatly simplifies the invented solution.

Figure 4:
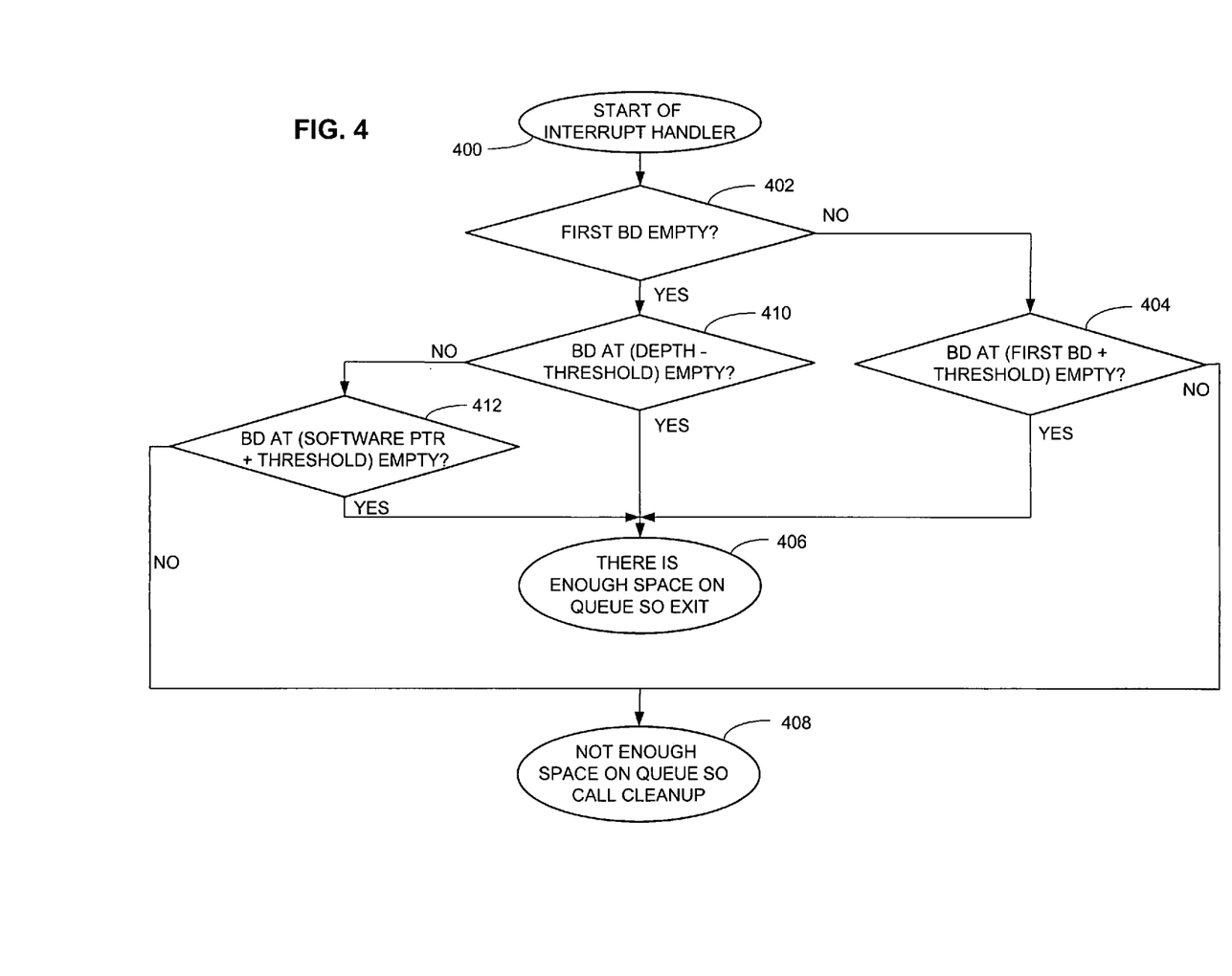
FIG. 4 is a flowchart illustrating the preferred method of determining whether the queue depth exceeds a defined threshold.

FIG. 4 illustrates how it is determined whether the input queue depth is large enough to warrant preemptive action. Note that this technique will be used at every interrupt handler to determine if the input queue depth is large enough to warrant a preemptive action in the form of a cleanup of the device's input queue. Under most circumstances, executing this short piece of code is the only overhead cost incurred because in most of the cases the queue depth will not be beyond the first threshold.

After the start of the interrupt handler, indicated at 400, the first buffer descriptor (BD) is tested at 402 to see if it is empty. If it is not, then it is determined at 404 whether the BD at (first BD+threshold) is empty. If so, then there is no need to free space on the input queue, as indicated at 406. If the BD at (first BD+threshold) is not empty, then the cleanup routine is called at 408.

If the first BD is empty, as determined at 402, then it is determined at 410 whether the BD at (depth−threshold) is also empty. If so, then there is no need to free space on the input queue, so the function is exited at 406. If the BD at (depth−threshold) is not empty, then it is determined at 412 whether the BD at (software pointer (ptr)+threshold) is empty. If so, then there is no need to free space on the input, so the routine is exited at 406. If the BD at (software ptr+threshold) is not empty, then the cleanup function is called at 408.

When the queue depth is found to exceed the first threshold, corrective action is required. This corrective action consists primarily of executing a simple classifier, or discriminator, routine to be described by reference to FIG. 5. As mentioned above, this simple classifier will use typical properties of voice data to eliminate non-voice data from the input queue. Any data that falls beyond the range of possible voice packets will be eliminated until there is sufficient space on the ring. This is marked by the second threshold. When sufficient space on the input ring is cleared, control is passed back to rest of the interrupt handler. Those of skill in the art will appreciate that the cleanup routine may provide the means for 'tuning' the values of the first and second thresholds and the voice packet size or payload range.

Figure 5:
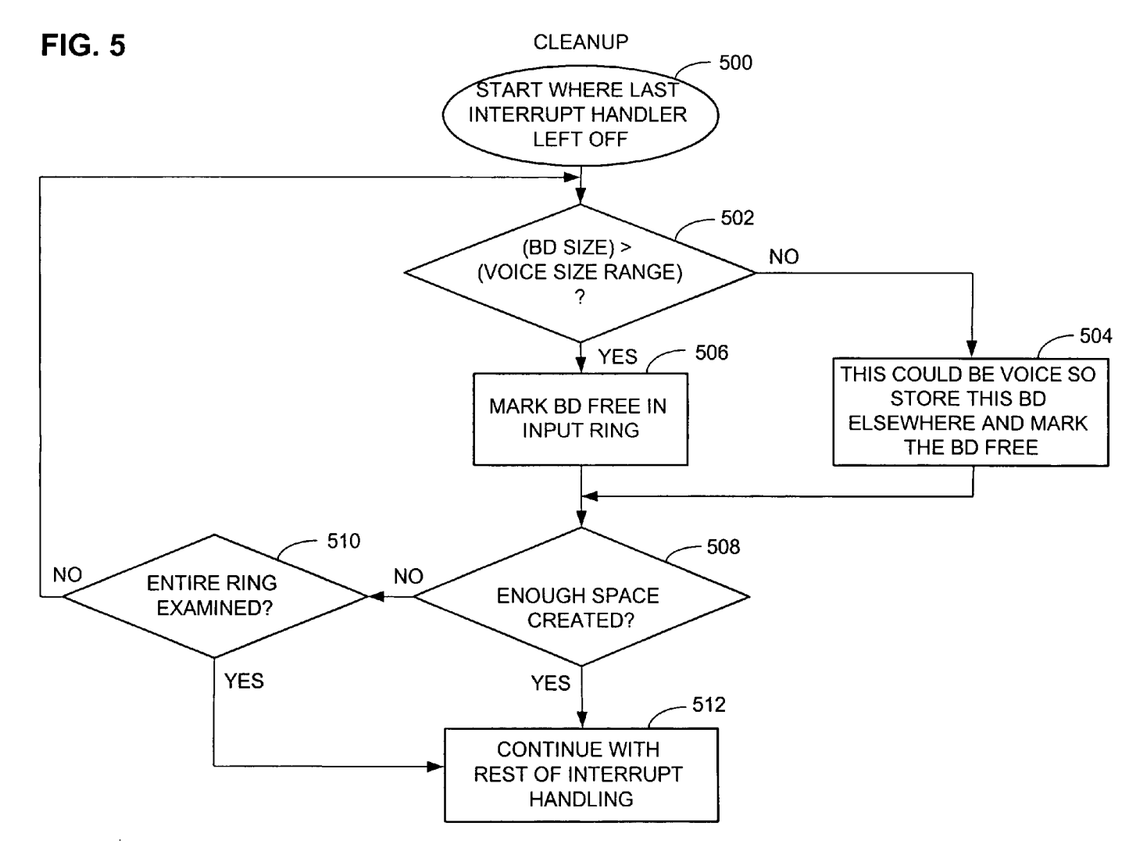
FIG. 5 is a flowchart illustrating how an input queue is cleaned up to eliminate data packets and to create space for voice packets.

Finally, FIG. 5 shows the cleanup software in accordance with the invention. According to this routine, the BD of the voice packets is stored to another temporary area if the voice packets are interleaved between data packets. The maximum size of this temporary area is the difference between the first and second thresholds. When control is relinquished back to the interrupt handler, the interrupt handler will first process buffers pointed out by buffer descriptors in this temporary area.

In FIG. 5, the cleanup function starts at 500. At 502, it is determined whether (BD size) exceeds (voice size range). If not, then at 504 the BD of the possible voice packet is stored and the BD is marked free. If (BD size) is less than or equal to (voice size range), then the BD is marked free in the input ring at 506, effectively discarding what has been packet size-determined not to be voice. At 508, it is determined whether enough space has been created in the input queue or ring. If not, then it is determined at 510 whether the entire input ring has been examined. The cleanup process is repeated until there is enough space or, if not, then until the entire ring has been examined. Then interrupt handling is resumed at 512.

Importantly, the cleanup code illustrated in FIG. 5 need be executed only in the case of congestion, as determined by the code illustrated in FIG. 4. Accordingly, under normal circumstances the invented solution will have virtually no impact on the performance of the router or other network node software on which it is installed. The only impact normally would be the time to execute the very few instructions involved with testing whether there is congestion, involving only decision blocks 402 (YES or NO), 404 (YES), 410 (YES or NO) and 412 (YES) in FIG. 4.

In accordance with the presently preferred embodiment, the simplest means of data classification is used. However, it is possible within the spirit and scope of the invention to use some other classification scheme. The central requirement is discrimination between voice and data. Thus, the differentiating filter preferably is designed to be loose enough to allow some non-voice packets to slip by as possible voice packets but never to permit the dropping of voice packets. Any suitably straightforward and low-cost classification or discrimination means is contemplated, and is within the spirit and scope of the invention.

After the cleanup code is executed, it may prove impossible to create enough free space at the input ring. In such a case, it is possible to achieve greater free space allocation using a more elaborate classification scheme or simply to continue with normal execution. However it very unlikely that such a situation will occur since voice traffic is only a small percentage of total traffic on a high-speed interface like a fast Ethernet. Moreover, most of the data traffic tries to attain the MTU limit, thus practically constraining the voice traffic.

As described above, an end user interface is provided in accordance with a preferred embodiment of the invention. Preferably, the user interface gives the user additional flexibility whereby the user may set:

1) First threshold which is queue depth that indicates congestion;
2) Second threshold to which it is desired the queue depth be reduced; and
3) Maximum size of data packet.

This might take the form of simple command like set interface threshold_1.

Finally, those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

The invention claimed is:

1. A method of reducing voice frame network inbound traffic congestion, the method comprising:
   determining whether a first defined threshold level of inbound voice and data traffic is reached, such that the threshold is examined after the arrival of each packet to a single input queue;
   if the first defined threshold is reached, then discriminating between inbound voice traffic and data traffic within the single input queue, wherein voice traffic comprises packets of voice-encoded data, said discriminating further comprising first analyzing a size of each packet of inbound voice and data traffic within the input queue and comparing the same to predefined packet size criteria to identify voice traffic; and
   freeing space within the input queue for use by inbound voice traffic by eliminating data traffic until the first defined threshold level of inbound traffic no longer is reached.

2. The method of claim 1 wherein said freeing space is performed until a second defined threshold level of inbound traffic is reached, the second defined threshold level being less than the first defined threshold level.

3. The method of claim 1 wherein said discriminating further includes second analyzing the rate at which packets of inbound voice and data traffic arrive in the input queue and comparing the same to predefined arrival rate criteria to identify voice traffic.

4. The method of claim 1, which further comprises:
   providing a user interface configured for setting the first defined threshold level.

5. The method of claim 1 wherein said freeing space is performed until a second defined threshold level of inbound traffic is reached, the second defined threshold level being less than the first defined threshold level, which further comprises prior to said determining:
   providing a user interface that permits a user to define the first and second defined threshold levels.

6. Apparatus for use with a single input queue representing inbound voice and data traffic on a voice frame network, the apparatus comprising:
   decision logic determining whether a first defined threshold level of inbound voice and data traffic represented in the single input queue is reached upon the reception of each packet of the traffic, wherein said decision logic includes an analyzer of the size of each packet of inbound voice and data traffic within the input queue and a comparator of the same to predefined packet size criteria to identify voice traffic; and
   queue management logic responsive to an affirmative determination from said decision logic, said queue management logic discriminating between inbound voice traffic comprised of encoded voice data and data traffic within the input queue and freeing space within the input queue for use by inbound voice traffic by eliminating data traffic until the first defined threshold level of inbound voice and data traffic no longer is reached.

7. The apparatus of claim 6 wherein said queue management logic frees space until a second defined threshold level of inbound traffic is reached, the second defined threshold level being less than the first defined threshold level.

8. The apparatus of claim 7, which further comprises:
a user interface that permits a user to define the first and second defined threshold levels.

9. The apparatus of claim 6 wherein said decision logic includes an analyzer of the rate at which packets of inbound voice and data traffic arrive in the input queue and a comparator of the same to predefined arrival rate criteria.

10. A computer-readable medium containing a program for reducing voice frame network inbound traffic congestion, the program comprising:
instructions for determining whether a first defined threshold level of inbound voice and data traffic is reached in a single input queue upon the arrival of each packet of traffic and if so then signaling such determination; and
instructions responsive to the signaling for discriminating between inbound voice traffic comprised of encoded voice data and data traffic within a single input queue, wherein the discriminating includes first analyzing the size of each packet of inbound voice and data traffic within the input queue and comparing the same to predefined packet size criteria to identify voice traffic, and for discarding data traffic thereby to free space within the input queue for use by inbound voice traffic until the first defined threshold level of inbound traffic no longer is reached.

11. The program of claim 10 wherein the discarding of data is performed until a second defined threshold level of inbound traffic is reached, the second defined threshold level being less than the first defined threshold level.

12. The program of claim 11, which further comprises:
instructions defining a user interface for permitting a user to set the first and second defined threshold levels.

13. The program of claim 10 wherein the discriminating includes second analyzing the rate at which packets of inbound voice and data traffic arrive in the input queue and comparing the same to predefined arrival rate criteria to identify voice traffic.

14. Apparatus for reducing voice frame network inbound traffic congestion, the apparatus comprising:
means for determining whether a first defined threshold level of inbound voice and data traffic is reached in a single input queue upon arrival of each packet and if so then signaling such determination; and
means responsive to the signaling for discriminating between inbound voice traffic comprised of encoded voice data and data traffic within the single input queue and for discarding data traffic thereby to free space within the input queue for use by inbound voice traffic until the first defined threshold level of inbound traffic no longer is reached, said discriminating means including means for first analyzing the size of each packet of inbound voice and data traffic within the input queue and means for first comparing the same to predefined packet size criteria to identify voice traffic, wherein the discarding of data is performed until a second defined threshold level of inbound traffic is reached, the second defined threshold level being less than the first defined threshold level.

15. The apparatus of claim 14 wherein said discriminating means further includes means for second analyzing the rate at which packets of inbound voice and data traffic arrive in the input queue and means for second comparing the same to predefined arrival rate criteria to identify voice traffic.

16. The apparatus of claim 15, which further comprises:
user interface means for permitting a user to set the first and second defined threshold levels.

* * * * *